(12) United States Patent
Sandy

(10) Patent No.: US 11,768,124 B2
(45) Date of Patent: Sep. 26, 2023

(54) AUTOMATIC TORQUE CALIBRATION

(71) Applicant: Apex Brands, Inc., Apex, NC (US)

(72) Inventor: Michael Robert Sandy, Lexington, SC (US)

(73) Assignee: APEX BRANDS, INC., Apex, NC (US)

(*) Notice: Subject to any disclaimer, the term of this patent is extended or adjusted under 35 U.S.C. 154(b) by 24 days.

(21) Appl. No.: 17/800,034

(22) PCT Filed: Nov. 24, 2020

(86) PCT No.: PCT/US2020/061955
§ 371 (c)(1),
(2) Date: Aug. 16, 2022

(87) PCT Pub. No.: WO2021/167668
PCT Pub. Date: Aug. 26, 2021

(65) Prior Publication Data
US 2023/0070284 A1 Mar. 9, 2023

Related U.S. Application Data

(60) Provisional application No. 62/977,500, filed on Feb. 17, 2020.

(51) Int. Cl.
*G01L 25/00* (2006.01)
*B25B 23/147* (2006.01)
(Continued)

(52) U.S. Cl.
CPC .............. *G01L 25/003* (2013.01); *B25B 21/02* (2013.01); *B25B 23/147* (2013.01); *B25F 5/00* (2013.01); *G05B 2219/45127* (2013.01)

(58) Field of Classification Search
CPC ...... G01L 25/003; B25B 21/02; B25B 23/147; B25F 5/00; G05B 2219/45127
See application file for complete search history.

(56) References Cited

U.S. PATENT DOCUMENTS

| 3,027,748 A | * | 4/1962 | Brenner | G01L 25/003 |
| | | | | 73/1.09 |
| 4,562,722 A | * | 1/1986 | Schuele et al. | G01L 25/003 |
| | | | | 73/11.01 |

(Continued)

FOREIGN PATENT DOCUMENTS

WO  2014041723 A1  3/2014

OTHER PUBLICATIONS

International Search Report and Written Opinion of corresponding International Application No. PCT/US2020/061955, mailed on Feb. 9, 2021, all enclosed pages cited herein.

*Primary Examiner* — Max H Noori
(74) *Attorney, Agent, or Firm* — BURR & FORMAN LLP

(57) ABSTRACT

An apparatus for calibrating a rotational tool includes a communications interface configured to establish a wireless communications link between a rotational tool and a calibrator to communicate one of a tool torque measurement or a calibrator torque measurement via the communications link. The apparatus may further include calibration processing circuitry configured to receive the tool torque measurement measured by a tool torque sensor, and receive the calibrator torque measurement measured by a calibrator torque sensor. The calibration processing circuitry may also be configured to compare the tool torque measurement to the calibrator torque measurement to determine a difference value, aggregate the difference value with previously determined difference values to determine an updated torque calibration factor, and cause a torque calibration factor associated with a torque sensor of the rotational tool to be automatically replaced with the updated torque calibration factor in the memory of the rotational tool.

20 Claims, 4 Drawing Sheets

(51) Int. Cl.
*B25B 21/02* (2006.01)
*B25F 5/00* (2006.01)

(56) References Cited

U.S. PATENT DOCUMENTS

| | | | |
|---|---|---|---|
| 2001/0026135 A1* | 10/2001 | Zalkin et al. | H02P 6/04 |
| | | | 318/432 |
| 2002/0139201 A1* | 10/2002 | Fanguy | B25B 23/1427 |
| | | | 73/862.21 |
| 2012/0143552 A1 | 6/2012 | Cho et al. | |
| 2016/0349039 A1* | 12/2016 | Marsh et al. | G01B 11/272 |
| 2018/0058969 A1 | 3/2018 | Mokhbery et al. | |
| 2019/0022836 A1 | 1/2019 | Chu et al. | |
| 2019/0101463 A1 | 4/2019 | Fly et al. | |
| 2019/0232471 A1 | 8/2019 | Paoli et al. | |
| 2020/0238486 A1 | 7/2020 | Huang | |
| 2021/0407123 A1* | 12/2021 | Tang et al. | G06T 7/80 |

* cited by examiner

AUTOMATIC TORQUE CALIBRATION

CROSS-REFERENCE TO RELATED APPLICATIONS

This application claims priority under 35 U.S.C. §119(e) to U.S. Provisional Application No. 62/977,500, filed Feb. 17, 2020, which is expressly incorporated by reference herein in its entirety.

TECHNICAL FIELD

Example embodiments generally relate to tools and tool operation, and particularly relate to systems, apparatuses, and methods for calibrating tools.

BACKGROUND

In many manufacturing settings, for example aerospace and automotive, rotational tools are used to secure fasteners (e.g., screws, bolts, nuts, etc.) to specified torques when constructing a product. Properly securing fasteners in such manufacturing contexts can be critical to the operation of the completed product, and therefore being able to accurately apply a specified torque to a fastener is important. Many rotational tools include internal torque sensors to measure the torque being applied. This measured torque may be used to the control the tool to tighten a fastener to a specified torque, and thus not over-tighten or under-tighten the fastener.

While rotational tools with such torque sensors can provide for accurately applying torque to a fastener, the sensors can lose calibration over time. As such, procedures are often implemented to check and correct calibration of rotational tool at, for example, industry standard intervals to ensure that the rotational tools continue to supply the specified torque when securing a fastener. The calibration procedure for checking the actual, applied torque can involve removing the tool from the manufacturing line and conducting calibration testing on a test bench. The test bench may include a torque sensor that measures the applied torque during a test fastener application (also known as a rundown). Based on the test bench measurements, calculations may be made to determine whether calibration of the tool is needed, and to what degree. Such a calibration process is manual and can be cumbersome and time consuming, requiring removal of the tool from the manufacturing process for an extended period of time. Additionally, depending the industry, calibration processes may be required to be conducted very frequently. Accordingly, innovation in the area of calibration technology is needed to, for example, expedite the calibration process and reduce the labor required to perform such calibration processes.

BRIEF SUMMARY OF SOME EXAMPLES

An example system for calibrating a rotational tool is provided. The example system may comprise a rotational tool and a calibrator. The rotational tool may comprise an output spindle configured to be operably coupled to a fastener to rotate the fastener, a tool torque sensor configured to measure a tool torque on the output spindle to generate a tool torque measurement indicating a torque applied to the output spindle. In this regard, the tool torque measurement may be based on a torque calibration factor stored in a memory of the rotational tool. The rotational tool may further comprise a tool communications interface configured to transmit and receive wireless communications. The calibrator may comprise a calibrator shaft comprising an input end and an output end. The calibrator shaft configured to be operably coupled to the output spindle of the rotatable tool on the input end and a fastener on the output end. The calibrator may further comprise a calibrator torque sensor configured to measure a calibrator torque on the calibrator shaft to generate a calibrator torque measurement indicating a torque applied to the calibrator shaft, and a calibrator communications interface configured to establish a wireless communication link with the tool communications interface to support a torque sensor calibration operation. The rotational tool or the calibrator may comprise calibration processing circuitry. In this regard, the calibration processing circuitry may be configured to receive the tool torque measurement, receive the calibrator torque measurement associated with the tool toque measurement, compare the tool torque measurement to the calibrator torque measurement to determine a difference value, aggregate the difference value with previously determined difference values to determine an updated torque calibration factor, and cause the torque calibration factor to be automatically replaced with the updated torque calibration factor in the memory of the rotational tool.

An example apparatus for calibrating a rotational tool is provided. The apparatus may include a communications interface configured to establish a wireless communications link between a rotational tool and a calibrator to communicate one of a tool torque measurement or a calibrator torque measurement via the communications link. The apparatus may further include calibration processing circuitry configured to receive the tool torque measurement measured by a tool torque sensor of the rotational tool, and receive the calibrator torque measurement associated with the tool toque measurement. In this regard, the calibrator torque measurement may be measured by a calibrator torque sensor of the calibrator. The calibration processing circuitry may also be configured to compare the tool torque measurement to the calibrator torque measurement to determine a difference value, aggregate the difference value with previously determined difference values to determine an updated torque calibration factor, and cause a torque calibration factor associated with a torque sensor of the rotational tool to be automatically replaced with the updated torque calibration factor in the memory of the rotational tool.

An example method is provided for calibrating a rotational tool. The example method may comprise receiving a tool torque measurement measured by a tool torque sensor of a rotational tool, and receiving, via wireless communications, a calibrator torque measurement associated with the tool toque measurement. In this regard, the calibrator torque measurement may be measured by a calibrator torque sensor of a calibrator. The example method may further comprise comparing the tool torque measurement to the calibrator torque measurement to determine a difference value, aggregating the difference value with previously determined difference values to determine an updated torque calibration factor, and causing a torque calibration factor associated with a torque sensor of the rotational tool to be automatically replaced with the updated torque calibration factor in the memory of the rotational tool.

BRIEF DESCRIPTION OF THE SEVERAL VIEWS OF THE DRAWING(S)

Having thus described some example embodiments in general terms, reference will now be made to the accompa- nying drawings, which are not necessarily drawn to scale, and wherein:

DETAILED DESCRIPTION

Figure 1:
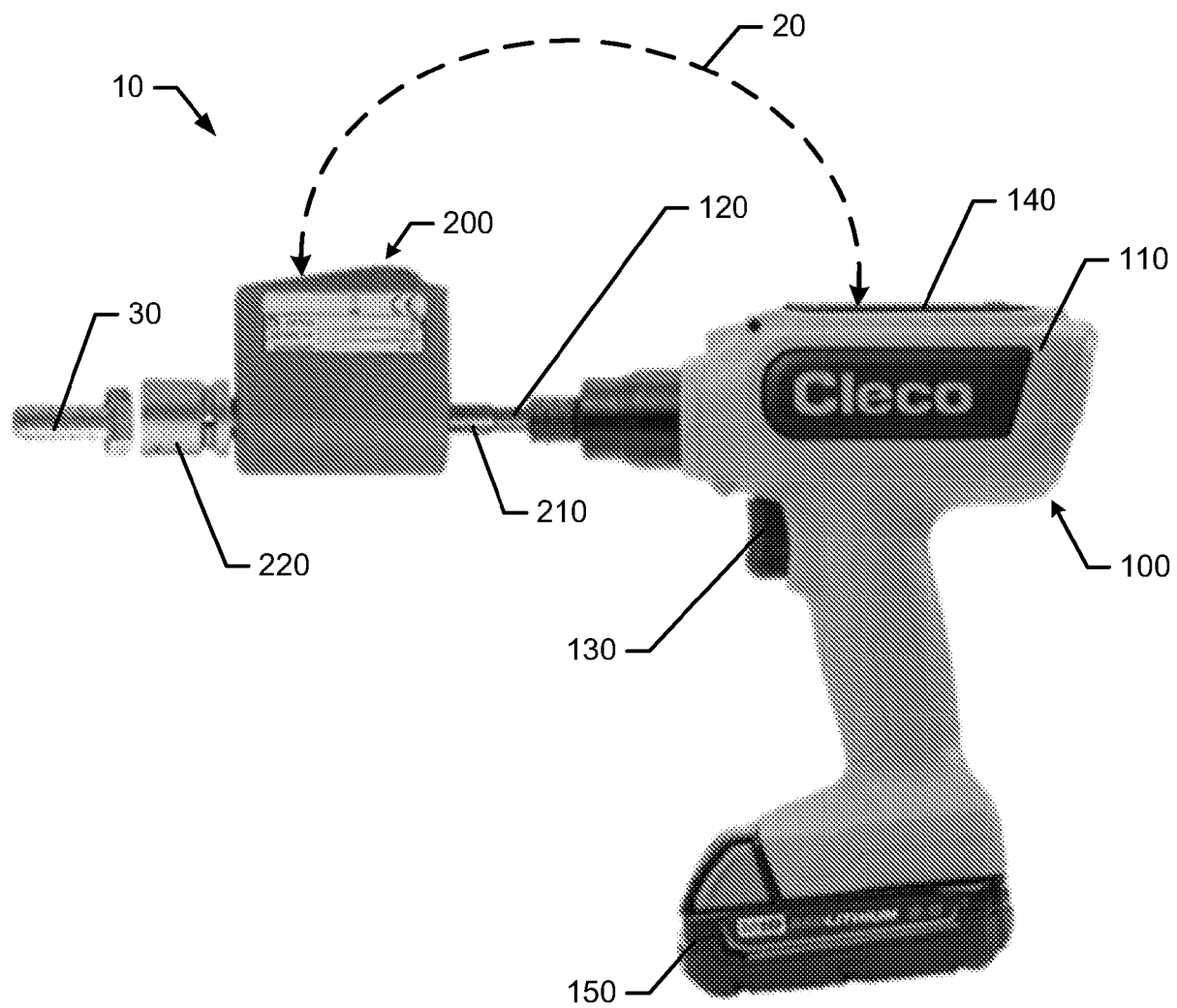
FIG. 1 illustrates an image of a calibration system for a rotational tool in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. As used herein, operable coupling should be understood to relate to direct or indirect connection that, in either case, enables functional interconnection of components that are operably coupled to each other.

According to some example embodiments, calibration systems, apparatuses, and methods are provided to automate calibration of a rotational tool. In this regard, a rotational tool with an internal torque sensor may be operably coupled to an external, portable calibrator (e.g., an external calibrator unit) that also includes torque sensor. Through mechanical coupling between the external calibrator and the rotational tool, torque may be measured separately by the tool torque sensor and the calibrator torque sensor during a series of calibration rundowns. For each of the calibration rundowns, the tool torque measurements and the calibrator torque measurements may be received by calibration processing circuitry (e.g., disposed in either the calibrator or the rotational tool). The calibrator and the rotational tool may communicate the tool torque measurements or the calibrator torque measurements associated with the calibration rundowns for receipt by the calibration processing circuitry via a wireless communication link established between the calibrator and the rotational tool. For each calibration rundown, the tool torque measurements and the calibrator torque measurements may be compared to determine respective difference values. The difference values may be aggregated (e.g., averaged), by the calibration processing circuitry to generate an updated torque calibration factor for the tool. In this regard, the torque calibration factor may be an updatable correction factor that is stored in a memory of the rotational tool and used when determining a tool torque measurement. As such, the current torque calibration factor stored in the memory of the tool may be automatically updated, by the calibration processing circuitry, with the newly determined torque calibration factor to thereby calibrate the rotational tool.

Figure 2:
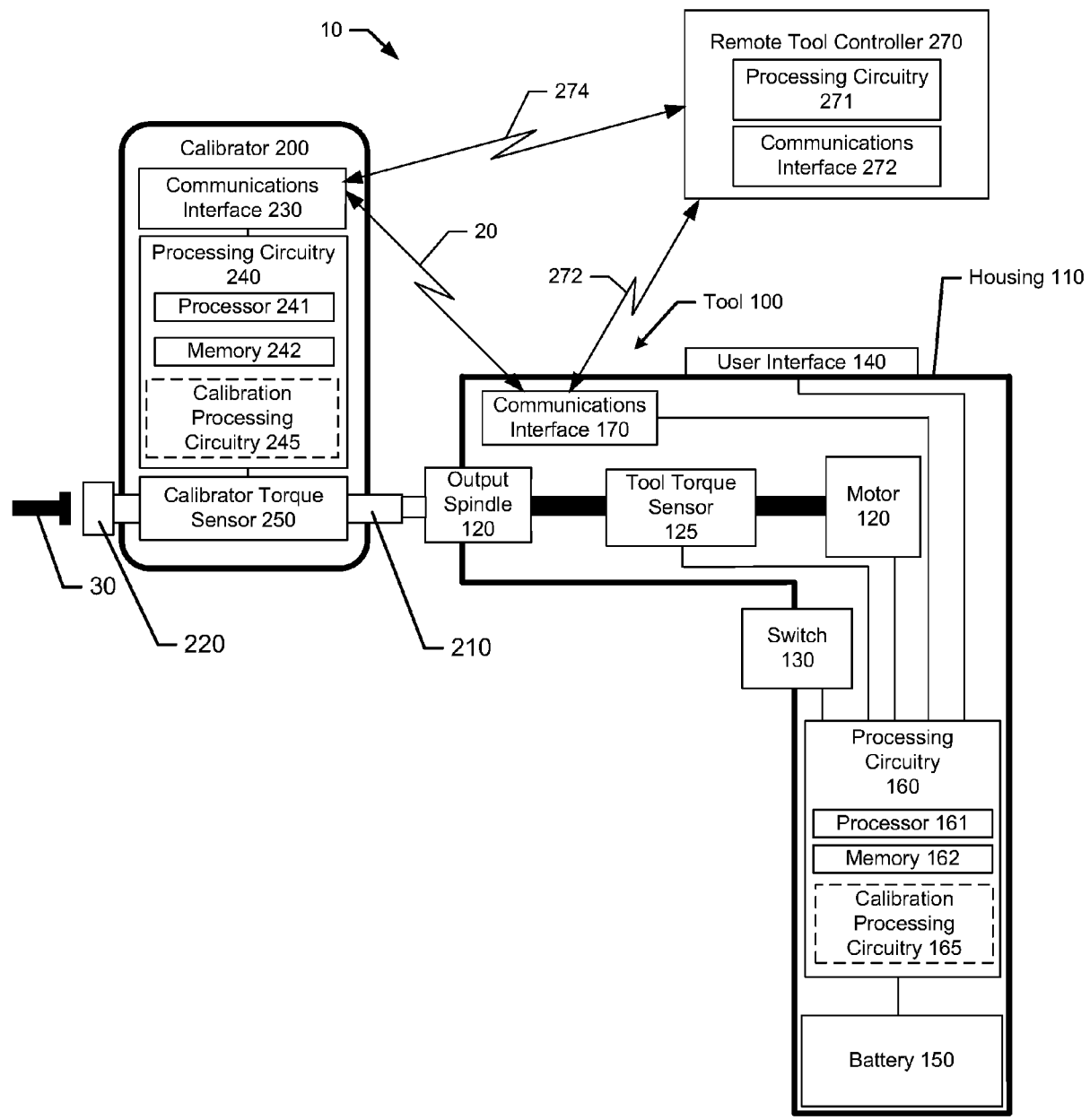
FIG. 2 illustrates a structural block diagram of a calibration system for a rotational tool in accordance with an example embodiment.

Accordingly, FIGS. 1 and 2 illustrate an example calibration system 10 comprising a rotational tool 100 and a calibrator 200. To implement a calibration process, the rotational tool 100 may be operably coupled to the calibrator 200 such that the calibrator 200 can be removed from the rotational tool 100 when the calibration process is complete.

The rotational tool 100 may be one example of a rotational tool according to some example embodiments. In this regard, according to some example embodiments, the rotational tool may be a nut driver, drill, power wrench, or the like. According to some example embodiments, the rotational tool may be a hand tool torque wrench with an electronic torque sensor. With reference to FIGS. 1 and 2, the rotational tool 100 may comprise a housing 110 within which a number of components may be housed.

According to some example embodiments, the rotational tool 100 may also include a motor 120 that operates to rotate an output spindle 120 of the rotational tool 100. In this regard, the motor 120 may, according to some example embodiments, be operably coupled to the output spindle 120 via a motor shaft. Although not shown, according to some example embodiments, gearing may be disposed between the motor 120 and the output spindle 120. The motor 120 may be, for example, electrically powered, pneumatically powered, or the like. Regardless of the type of motor, the motor 120 may be controlled by the processing circuitry 160 as further described below. The output spindle 120 may be a rotatable shaft that extends out of the housing 110. An operating end of the output spindle 120 may be formed to be capable of engagement with a variety of sockets or other driver bits. As such, the output spindle 120 may be configured to be operably coupled to a fastener (e.g., via a socket, driver bit, or the like) to rotate the fastener.

The rotational tool 100 may, according to some example embodiments, be powered, generally, from an electric source. The electric source may provide electrical power to the rotational tool 100 via, for example, an electrical wire or cable. However, according to some example embodiments, the electric source for powering the rotational tool 100 may be a battery 150. Battery 150 may be rechargeable and may provide electrical power to support the operation of, for example, the motor 120 and the processing circuitry 160. As a battery operated device, the rotational tool 100 may be portable.

The rotational tool 100 may also include a tool torque sensor 125. The tool torque sensor 125 may be, according to some example embodiments, a torque transducer. The tool torque sensor 125 may be operably coupled to, for example, the motor shaft or the output spindle 120 to measure a torque being applied to the motor shaft or the output spindle 120 by the motor 120. In this regard, the tool torque sensor 125 may be configured to measure the mechanical torque being applied to the output spindle 120 and the motor shaft by the motor 120 and convert that measurement into an electrical signal that may be provided to the processing circuitry 160. In this regard, the tool torque sensor 125 may be configured to generate a tool torque measurement indicating a torque applied to the output spindle 120. As further described below, the tool torque measurement may be based on a torque calibration factor stored in the memory 162 of the rotational tool 100.

The processing circuitry 160 of the rotational tool 100 may be configured to perform various operations associated with operation of the rotational tool 100 as described herein. The processing circuitry 160 may include, for example, a processor 161 and a memory 162 that may be configured to support various functionalities of rotational tool 100 described herein. The processing circuitry 160 may also include other passive and active electronic components configured to support the operation of the processing circuitry 160 and the rotational tool 100 as described herein. In some example embodiments, the processor 161 of the processing circuitry 160 may be configured to execute instructions stored in, for example, the memory 162 to effectuate the functionality of the rotational tool 100 described herein. Alternatively, the processor may be hardware configured as, for example, an application specific integrated circuit (ASIC), a field programmable gate array (FPGA), or the like and configured to execute the functionality of the processing circuitry 160 as described herein. Further, the processing circuitry 160 may be configured to include or implement the functionality described with respect to the calibration processing circuitry 165 as provided herein. In this regard, the calibration processing circuitry 165 may be embodied by the processing circuitry 160.

The processing circuitry 160 may be configured to control the operation of rotational tool 100. In this regard, the processing circuitry 160 may be configured to receive inputs and, based on the inputs, provide outputs to control the operation of the rotational tool 100. For example, the processing circuitry 160 may be configured to receive an input signal from the switch 130 and, based on the input signal from the switch 130, control the operation of the motor 120 by controlling the power being provided to the motor 120 by the battery 150.

Additionally, the processing circuitry 160 may be configured to receive input signals from the user interface 140. The user interface 140 may include, for example, a display and controls, for example, in the form of buttons. Via the controls of the user interface 140, a user may be able to input a specific torque value that the rotational tool 100 may use when rotating and securing a fastener. In this regard, the processing circuitry 160 may be configured to receive the specific torque value and permit the motor 120 to operate to turn the output spindle 120, until the torque measurement signal provided by the tool torque sensor 125 indicates that the torque being applied by the motor 120 on the motor shaft has reached the specific torque value. The processing circuitry 160 may be configured to compare the measured torque, as indicated by the torque measurement signal from the tool torque sensor 125, to the specified torque value, and, when the measured torque value is equal to the specified torque value, the processing circuitry 160 may be configured to discontinue supplying power to the motor 120. As such, the processing circuitry 160 may be configured to control the torque output of the motor 120 based on a specified torque value input by a user via the user interface 140.

The processing circuitry 160 may be configured to determine the tool torque measurement based on a torque calibration factor stored in the memory 162. The torque calibration factor may be used to correct for known error in the raw measurement of the tool torque sensor 125. In this regard, the tool torque sensor 125 may provide measurement signals that may be combined with the torque calibration factor, via an algorithm, to determine a corrected torque. In this regard, the torque measurement that is used by the processing circuitry 160 to control the motor 120, may be determined by applying the torque calibration factor to the information received in the torque measurement signal provided by the tool torque sensor 125. In this regard, as further described below, the output of the tool torque sensor 125 may, for example, drift over time due to, for example, continued use. As such, modification or updating of the torque calibration factor in the memory 162 may be conducted to correct for the changes in the tool torque sensor 125 that would otherwise cause the tool torque measurement to be inaccurate.

Additionally, the rotational tool 100 may include a communications interface 170 (i.e., the tool communications interface) configured to transmit and receive wireless communications. The communications interface 170 may be configured to establish a wireless communications link with a remote device. The communications interface 170 may include an antenna and a radio configured to transmit or receive communications via an established communication link. The communications interface 170 may support one or more communication protocols such as, for example, Bluetooth, WiFi, cellular protocols (e.g., 3G, 4G, LTE, 5G, or the like). The communications interface 170 may receive information from the processing circuitry 160, which may be configured to provide information to the communications interface 170 for transmission to a remote device via the communications link. The processing circuitry 160 may also be configured to receive information from the communications interface 170 and a remote device that was transmitted via the communications link.

According to some example embodiments, the communications interface 170 may include a scanner that may be implemented as a camera or bar code scanner. In this regard, the scanner may be configured to receive communications by scanning, for example, a bar code or other optical code that may be static (e.g., on a label) or dynamic (e.g., generated on a display of a remote device). Accordingly, use of the scanner may be a form of communications link between the rotational tool 100 and a remote device.

Having described aspects of the structure and operation of the rotational tool 100, the following will provide a description of aspects of the structure and operation of the calibrator 200. According to some example embodiments, the calibrator 200 may be a portable device that may be utilized to automatically calibrate a rotational tool, according to some example embodiments. In this regard, the calibrator 200 may be battery powered according to some example embodiments. As mentioned above, the calibrator 200 may be configured to assist in a calibration process for calibrating the tool torque sensor 125 of the rotational tool 100 by updating the torque calibration factor. In this regard, the calibrator 200 may be configured to measure a torque on a calibrator shaft 210 of the calibrator 200 and that measured torque may be used in the calibration process. According to some example embodiments, the calibrator 200 may comprise a calibrator shaft 210, a communications interface 230, processing circuitry 240, and a calibrator torque sensor 250.

According to some example embodiments, the calibrator shaft 210 may pass through a housing of the calibrator 200 and thus have an input end and an output end. The input end may be configured for coupling to an output spindle (e.g., output spindle 120) of a rotational tool. The output end may be configured similar to the operational end of the output spindle 120. In this regard, the output end of the calibrator shaft 210 may be formed to be able to engage with a variety of sockets (e.g., socket 220) or other driver bits. Accordingly, during a calibration process, the output end may be operably coupled to a fastener (e.g., fastener 30) for a rundown.

The calibrator torque sensor 250 may be configured to measure a torque applied to the calibrator shaft 210 and generate an output signal indicative of the torque measurement. In this regard, according to some example embodiments, the calibrator torque sensor 250 may be, according to some example embodiments, a torque transducer. The calibrator torque sensor 250 may be operably coupled to, for example, the calibrator shaft 210 to measure a torque being applied to the calibrator shaft 210 via the input end. In this regard, the calibrator torque sensor 250 may be configured to measure the mechanical torque being applied to the calibrator shaft 210 and convert that measurement into an electrical signal that may be provided to the processing circuitry 240. As such, the calibrator torque sensor 250 may be configured to generate a calibrator torque measurement indicating a torque applied to the calibrator shaft 210.

The processing circuitry 240 of the calibrator 200 may be configured to perform various operations associated with the calibrator 200 as described herein. The processing circuitry 240 may include, for example, a processor 241 and a memory 242 that may be configured to support various functionalities of calibrator 200 described herein. The processing circuitry 240 may also include other passive and active electronic components configured to support the operation of the processing circuitry 240 and the calibrator 200 as described herein. In some example embodiments, the processor 241 of the processing circuitry 240 may be configured to execute instructions stored in, for example, the memory 242 to effectuate the functionality of the calibrator 200 described herein. Alternatively, the processor may be hardware configured as, for example, an application specific integrated circuit (ASIC), a field programmable gate array (FPGA), or the like and configured to execute the functionality of the processing circuitry 240 as described herein. Further, the processing circuitry 240 may be configured to include or implement the functionality described with respect to the calibration processing circuitry 245 as described herein. In this regard, the calibration processing circuitry 245 may be embodied by the processing circuitry 240.

The processing circuitry 240 may be configured to control the operation of calibrator 200. In this regard, the processing circuitry 240 may be configured to receive inputs and, based on the inputs, provide outputs to control the operation of the calibrator 200. According to some example embodiments, the processing circuitry 240 may be configured to receive a torque measurement signal from the calibrator torque sensor 250 that is an indication of the torque applied to the calibrator shaft 210. As further described below, the calibrator torque measurement may be used to calibrate the tool torque sensor 125 of the rotational tool 100.

Additionally, the communications interface 230 of the calibrator 200 (i.e., the calibrator communications interface) may be configured to transmit and receive wireless communications. In this regard, the communications interface 230 may be configured to establish a wireless communications link with a remote device. The communications interface 230 may include an antenna and a radio configured to transmit or receive communications via an established communication link. The communications interface 230 may support one or more communication protocols such as, for example, Bluetooth, WiFi, cellular protocols (e.g., 3G, 4G, LTE, 5G, or the like). The communications interface 230 may receive information from the processing circuitry 240, which may be configured to provide information to the communications interface 230 for transmission to a remote device via the communications link. The processing circuitry 240 may also be configured to receive information from the communications interface 230 from a remote device that was transmitted to the communications interface 230 via the communications link.

According to some example embodiments, the communications interface 230 may include a display. The display may be controlled to generate, for example, a bar code or other optical code that may be scanned by scanner of a remote device (e.g., rotational tool 100). In this manner, the processing circuitry 240 may be configured to control the display of the calibrator 200 to convey information (e.g., an updated torque calibration factor) to a remote device (e.g., the rotational tool 100).

The rotational tool 100 and the calibrator 200, within the system 10, will now be described with respect to roles for implementing a calibration process for the rotational tool 100. The dashed boxes of the calibration processing circuitry 165 and 245 indicate, depending on the example embodiment, that the calibration processing circuitry as further described below may either be a component of, or implemented by, the processing circuitry 160 or the processing circuitry 240. In this regard, according to some example embodiments, the updated torque calibration factor may be determined at the calibrator 200 via processing circuitry 240 including the calibration processing circuitry 245. Alternatively, according to some example embodiments, the updated torque calibration factor may be determined at the rotational tool 100 via processing circuitry 160 including the calibration processing circuitry 165. Accordingly, the calibration processing circuitry 165 and 245 may be similarly configured as described below.

Initially, with respect to the physical interaction between the rotational tool 100 and the calibrator 200, the output spindle 120 of the rotational tool 100 may be coupled to the input end of the calibrator shaft 210. As such, the rotational tool 100 with the calibrator 200 attached at the output spindle 120 may implement a plurality of rundowns (e.g., by rotationally securing a fastener, such as fastener 30). In this regard, the calibrator shaft 210 may be operably coupled to the output spindle 120 such that the motor 120 rotates and applies a torque to the calibrator shaft 210.

Additionally, a wireless communications link 20 may be established between the communications interface 230 of the calibrator 200 and the communications interface 170 of the rotational tool 100. In this regard, according to some example embodiments, the user interface 140 may be configured to receive a user input to place the rotational tool in a calibration mode to initiate the calibration process prior to performing a first rundown in the calibration process. According to some example embodiments, in response to entering the calibration mode, the rotational tool 100 may be configured to, via the communications interface 170, wirelessly pair with the communications interface 230 to establish the communications link 20.

In association with a given rundown event, which may be a final rundown event in a calibration sequence, the calibration processing circuitry (implemented as calibration processing circuitry 165 or 245) may be configured to receive a tool torque measurement and receive the calibrator torque measurement associated with the tool toque measurement. Depending on the configuration of the system with respect to the calibration processing circuitry 165 or 245, the tool torque measurement or the calibrator torque measurement may be received either from a respective local torque sensor or via the communications link 20 from a remote torque sensor. In this regard, if the calibration processing circuitry 165 is being implemented, the communications interface 230 may transmit the calibrator torque measurement to the communications interface 170 to be received by the calibration processing circuitry 165. However, if the calibration processing circuitry 245 is being implemented, the communications interface 170 may transmit the tool torque measurement to the communications interface 230 to be received by the calibration processing circuitry 245.

The calibration processing circuitry 165 or 245 may be configured to compare the tool torque measurement to the calibrator torque measurement to determine a difference value. In this regard, the difference value may be associated with the specific rundown event. As such, the rotational tool 100 and the calibrator 200 may be synchronized to permit the calibration processing circuitry 165 or 245 to form a data couple that links the tool torque measurement with the calibrator torque measurement for the same rundown event. As such, a tool torque measurement and a calibrator torque measurement may be received and analyzed by the calibration processing circuitry 165 or 245 for each rundown event. According to some example embodiments, upon determining the difference value, the calibration processing circuitry 165 or 245 may be configured to store the difference value in a memory (e.g., memory 162 or 242, respectively). The difference value may be stored into an array of difference values that have been previously stored in association with previous rundowns. According to some example embodiments, the difference value may be stored in a common memory location or register as an aggregated value, as further described below.

Upon determining the difference value, the calibration processing circuitry 165 or 245 may be configured to aggregate the difference value with previously determined difference values to determine an updated torque calibration factor. In this regard, aggregating the difference value may be performed in a number of ways according to various example embodiments. According to some example embodiments, each difference value associated with a rundown may be retrieved and an average of the difference values may be determined. In this regard, for example, the calibration processing circuitry 165 or 245 may be configured to calculate an average difference value based on a final difference value and the previously determined difference values. The calculated average, according to some example embodiments, may be the updated torque calibration factor for the rotational tool 100. Alternatively, according to some example embodiments, each newly determined difference value may be added to a current total and a counter may be incremented. When the sequence of rundowns is complete, the current total may be divided by the counter value to determine an average difference value, which may be the updated torque calibration factor.

The calibration processing circuitry 165 or 245 may also be configured to cause the torque calibration factor for the rotational tool 100 to be automatically replaced with the updated torque calibration factor in the memory 162 of the rotational tool 100. In this regard, if the calibration processing circuitry 165 is being implemented, then the operation of replacing the torque calibration factor with the updated torque calibration factor may be a local operation. However, if the calibration processing circuitry 245 is being implemented, then the operation of replacing the torque calibration factor with the updated torque calibration factor may include transmitting the updated torque calibration factor to the communications interface 170 of rotational tool 100 to automatically replace the torque calibration factor with the updated torque calibration factor in the memory 162.

Further, according to some example embodiments, the calibration processing circuitry 165 or 245 may be configured to establish a communications link (e.g., communications link 272 or 274) to a remote tool controller 270. In this regard, the remote tool controller 270 may be configured to communicate, via communications interface 272 (which may be similar to the communications interfaces 170 and 230) with a plurality of tools within a workspace to collect tool-based data from the tools, such as torque settings, operation time, battery level, location, or the like, and also provide instructions or alerts to the tools to indicate, for example, that maintenance of a tool is required or to change the operating settings (e.g., the torque setting) on a tool for a given operation to be performed by the tool. The remote tool controller 270, via the processing circuitry 271, may be configured to control the communications interface 272 of the remote tool controller 270 to establish a wireless communications link (e.g., pair) with the communications interface 230 of the calibrator 200. Such a communications link may be initiated by either the calibrator 200 or the remote tool controller 270. The remote tool controller 270, via the processing circuitry 271, may also be configured to control the communications interface 272 of the remote tool controller 270 to establish a communications link (e.g., pair) with the communications interface 170 of the rotational tool 100. In this regard, the communication link between the remote tool controller 270 and the rotational tool 100 may be a wireless communications link or a wired communications link, which may be initiated by the either the remote tool controller 270 or the rotational tool 100. The communications links between the rotational tool 100 and the remote tool controller 270 or the calibrator 200 and the remote tool controller 270 may be wireless communications links through one or more routers. Further, the communications links between the rotational tool 100 and the remote tool controller 270 or the calibrator 200 and the remote tool controller 270 may be internet protocol links.

According to some example embodiments, the remote tool controller 270 may be configured to receive calibration information (e.g., tool torque measurements and calibrator torque measurements) and perform a calibration analysis of the information to facilitate calibrating the rotational tool 100. For example, according to some example embodiments, the processing circuitry 271 of the remote tool controller 270 may be configured to perform some or all of the operations of the calibration processing circuitry 165 or 245. In this regard, for example, the remote tool controller 270, and more specifically, the processing circuitry 271 may be configured to send instructions to the communications interface 170 of the rotational tool 100 to place the rotational tool 100 in a calibration mode. While in the calibration mode, the rotational tool 100 and the processing circuitry 160 may be configured to communicate tool torque measurements to the remote tool controller 270 and the processing circuitry 271.

Further, according to some example embodiments, the calibration processing circuitry 165 or 245 may be configured to communicate to the remote tool controller 270, and to the processing circuitry 271 of the remote tool controller 270, that the rotational tool 100 has been calibrated. In this regard, the communication indicating that the rotational tool 100 has been calibrated or that the torque calibration factor has been updated may include, for example, a unique identifier for the rotational tool 100, a time stamp for when the calibration was completed, the updated torque calibration factor, or the like. Further, even in circumstances where the updated torque calibration factor is the same as the previous torque calibration factor (i.e., no change in the value occurs), the calibration processing circuitry 165 or 245 may be configured to communicate to the remote tool controller 270 that the rotational tool 100 has been calibrated.

Further, according to some example embodiments, the remote tool controller 270 may include processing circuitry 271, which may include a memory or processor that is the same or similar to the processing circuitry 160 or 240. The processing circuitry 271, may be configured to receive, via the communications interface 272, the tool torque measurement via a wired or wireless communication from the communications interface 170 of the rotational tool 100. In this regard, although the communication link 272 is shown in FIG. 2 as being a wireless communication, according to some example embodiments, a wired connection and associated link may be established between the rotational tool 100 and the remote tool controller 270. Further, the processing circuitry 271 may be configured to receive a calibrator torque measurement associated with the tool toque measurement via wireless communication from the communications interface 230 of the calibrator 200 to the remote tool controller 270. Additionally, the processing circuitry 271 may be configured to receive an act upon the tool torque measurements and the calibrator torque measurements as described herein. In this regard, for example, the processing circuitry 271 may be configured to compare the tool torque measurement to the calibrator torque measurement to determine a difference value, aggregate the difference value with previously determined difference values to determine an updated torque calibration factor, and cause a torque calibration factor associated with a torque sensor of the rotational tool to be automatically replaced with the updated torque calibration factor in the memory of the rotational tool by sending associated information and instructions to the processing circuitry 240 of the rotational tool 100.

Figure 3:
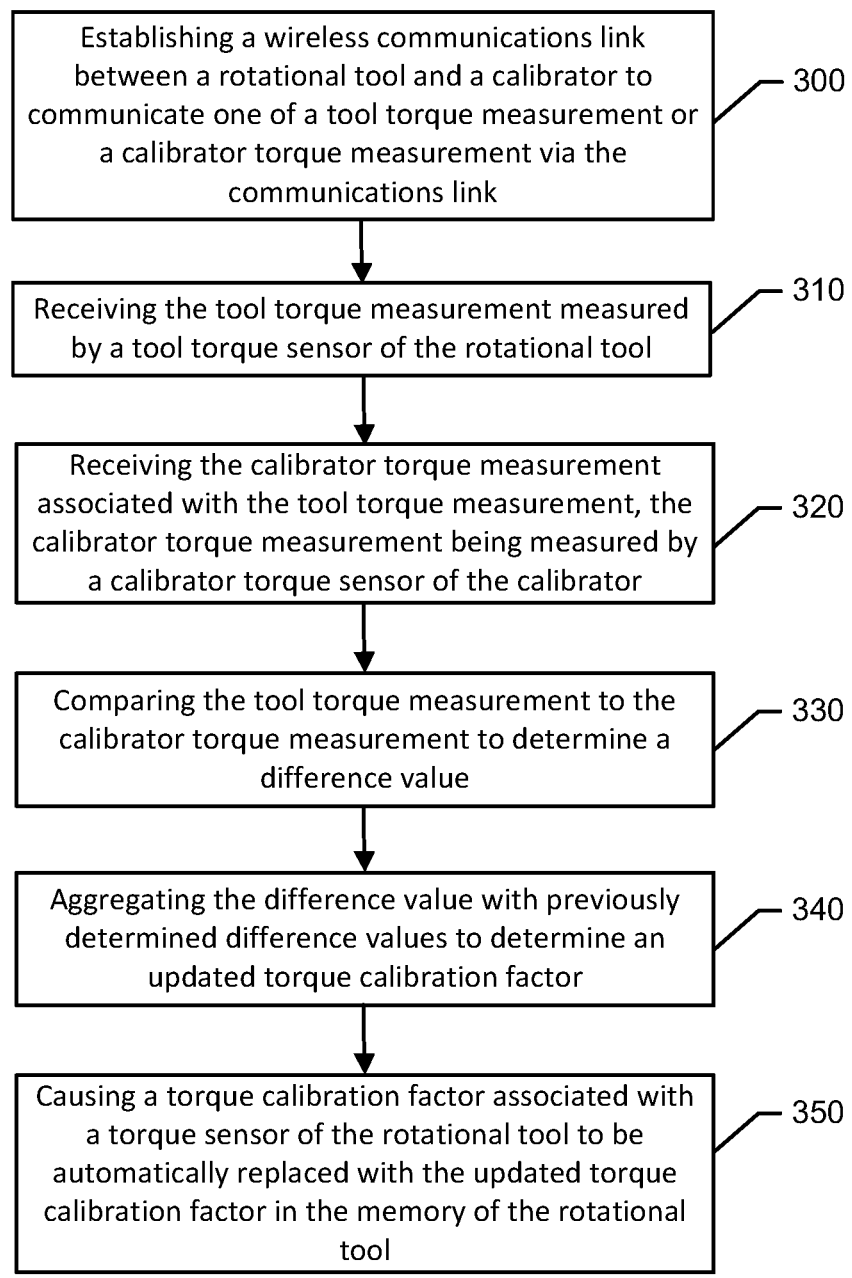
FIG. 3 illustrates an example flow chart for a calibration method in accordance with an example embodiment.

Now referring to FIG. 3, an example method of a calibration process is provided. According to some example embodiments, the example method may be performed by, for example, the processing circuitry 240 of the calibrator or the processing circuitry 160 of the rotational tool 100.

In this regard, at 300, the example method includes establishing a wireless communications link between a rotational tool and a calibrator to communicate one of a tool torque measurement or a calibrator torque measurement via the communications link. Additionally, at 310, the example method may include receiving the tool torque measurement measured by a tool torque sensor of the rotational tool. At 320, the example method may include receiving the calibrator torque measurement associated with the tool toque measurement. The calibrator torque measurement may be measured by a calibrator torque sensor of the calibrator. The example method may further include, at 330, comparing the tool torque measurement to the calibrator torque measurement to determine a difference value. Additionally, the example method may include aggregating the difference value with previously determined difference values to determine an updated torque calibration factor, at 340. Further, the example method may include, at 350, causing a torque calibration factor associated with a torque sensor of the rotational tool to be automatically replaced with the updated torque calibration factor in the memory of the rotational tool.

Additionally, according to some example embodiments, receiving the calibrator torque measurement may comprise receiving the calibrator torque measurement via the communications link from the calibrator. Accordingly, the example method may include measuring, by the tool torque sensor, a tool torque on an output spindle of a rotational tool to generate the tool torque measurement indicating a torque applied to the output spindle. In this regard, the tool torque measurement may be based on the torque calibration factor stored in the memory of the rotational tool. Additionally, the example method may include receiving a user input via a user interface of the rotational tool to place the rotational tool in a calibration mode. Further, the example method may also include, in response to entering the calibration mode, wirelessly pairing the rotational tool to the calibrator to establish the communications link.

Additionally or alternatively, the example method may include receiving the tool torque measurement via the communications link from the rotational tool, and measuring, by the calibrator torque sensor, a calibrator torque on a calibrator shaft of the calibrator to generate the calibrator torque measurement indicating a torque applied to the calibrator shaft. In this regard, the calibrator shaft may be operably coupled to an output spindle of the rotational tool and a fastener. Additionally, according to some example embodiments, causing the torque calibration factor to be automatically replaced with the updated torque calibration factor may comprise transmitting the updated torque calibration factor to the rotational tool via the communications link to replace the torque calibration factor in the memory of the rotational tool.

Additionally or alternatively, according to some example embodiments, aggregating the difference value with previously determined difference values, according to the example method, may comprise calculating an average difference value based on the difference value and the previously determined difference values. In this regard, the average difference value may be the updated torque calibration factor. Additionally or alternatively, establishing the wireless communications link, according to the example method, may comprise establishing a Bluetooth connection. Additionally or alternatively, the example method may further include, in response to causing the torque calibration factor to be automatically replaced communicating to the remote tool controller that the rotational tool has been calibrated. In this regard, the communication indicating that the rotational tool has been calibrated or that the torque calibration factor has been updated may include, for example, a unique identifier for the rotational tool, a time stamp for when the calibration was completed, the updated torque calibration factor, or the like.

Figure 4:
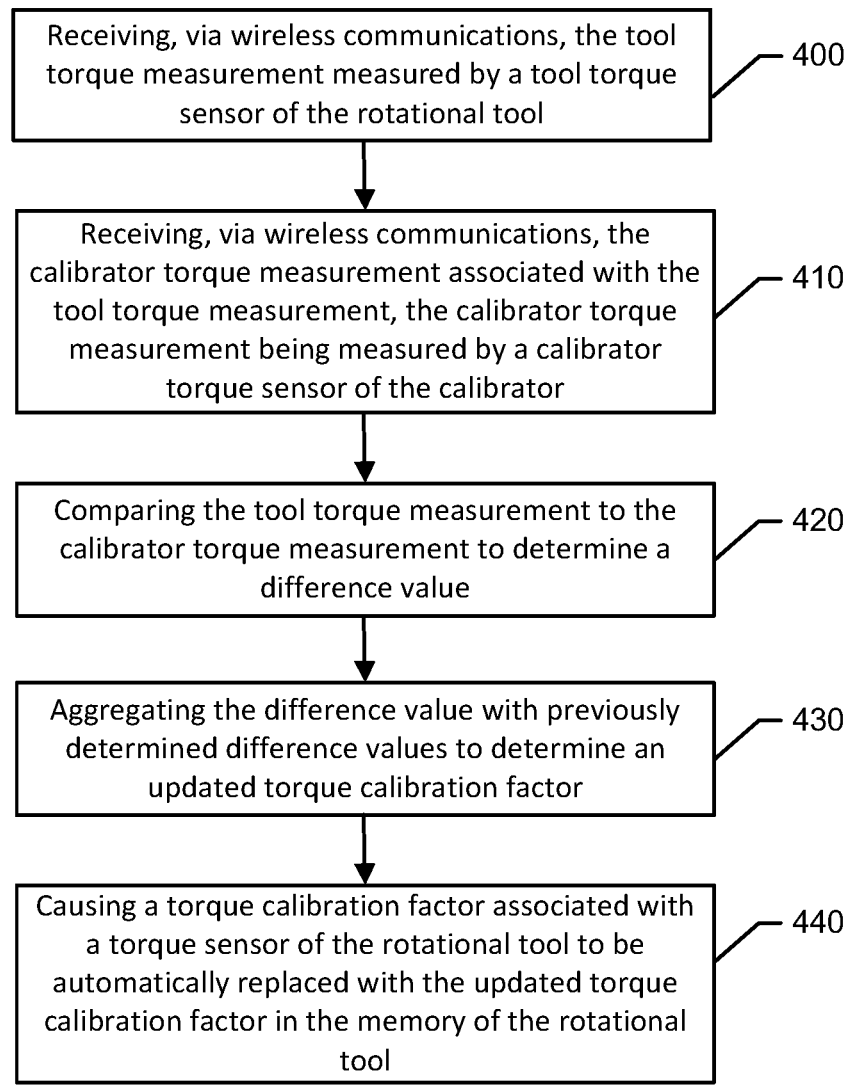
FIG. 4 illustrates another example flow chart for a calibration method in accordance with an example embodiment.

Now referring to FIG. 4, another example method of a calibration process is provided. According to some example embodiments, the example method may be performed by, for example, the processing circuitry 271 of the remote tool controller 270, or the processing circuitry 160 or 240.

In this regard, according to some example embodiments, example method may include, at 400, receiving the tool torque measurement measured by a tool torque sensor of a rotational tool. At 410, the example method may include receiving, via wireless communications, a calibrator torque measurement associated with the tool toque measurement. In this regard, the calibrator torque measurement being measured by a calibrator torque sensor of a calibrator. Further, at 420, the example method may include comparing the tool torque measurement to the calibrator torque measurement to determine a difference value, and, at 430, aggregating the difference value with previously determined difference values to determine an updated torque calibration factor. The example method may also include, at 440, causing a torque calibration factor associated with a torque sensor of the rotational tool to be automatically replaced with the updated torque calibration factor in the memory of the rotational tool. In this regard, the torque calibration factor may be provided by the remote tool controller 270 to the rotational tool 100 and thus the remote tool controller 270 may be configured to cause the automatic replacement of the torque calibration factor.

Additionally, according to some example embodiments, the example method may include measuring, by the tool torque sensor, a tool torque on an output spindle of a rotational tool to generate the tool torque measurement indicating a torque applied to the output spindle. In this regard, the tool torque measurement may be based on the torque calibration factor stored in the memory of the rotational tool. Additionally, the example method may include receiving a user input via a user interface of the rotational tool to place the rotational tool in a calibration mode. Further, the example method may also include, in response to entering the calibration mode, wirelessly pairing the rotational tool to the calibrator to establish the communications link.

Additionally or alternatively, the example method may include receiving the tool torque measurement via a wireless communications link from the rotational tool, and measuring, by the calibrator torque sensor, a calibrator torque on a calibrator shaft of the calibrator to generate the calibrator torque measurement indicating a torque applied to the calibrator shaft. In this regard, the calibrator shaft may be operably coupled to an output spindle of the rotational tool and a fastener. Additionally, according to some example embodiments, causing the torque calibration factor to be automatically replaced with the updated torque calibration factor may comprise transmitting the updated torque calibration factor to the rotational tool via the communications link to replace the torque calibration factor in the memory of the rotational tool.

Additionally or alternatively, according to some example embodiments, aggregating the difference value with previously determined difference values, according to the example method, may comprise calculating an average difference value based on the difference value and the previously determined difference values. In this regard, the average difference value may be the updated torque calibration factor. Additionally or alternatively, receiving the tool torque measurement includes receiving the tool torque measurement at a remote tool controller, and receiving the calibrator torque measurement includes receiving the calibrator torque measurement as the remote tool controller.

Many modifications and other embodiments beyond those set forth herein will come to mind to one skilled in the art to which these inventions pertain having the benefit of the teachings presented in the foregoing descriptions and the associated drawings. Therefore, it is to be understood that the specific embodiments disclosed herein are not limiting and that modifications and other embodiments are intended to be included within the scope. Moreover, although the foregoing descriptions and the associated drawings describe example embodiments in the context of certain example combinations of elements and/or functions, it should be appreciated that different combinations of elements and/or functions may be provided by alternative embodiments without departing from the scope. In this regard, for example, different combinations of elements and/or functions than those explicitly described above are also contemplated. In cases where advantages, benefits, or solutions to problems are described herein, it should be appreciated that such advantages, benefits, or solutions may be applicable to some example embodiments, but not necessarily all example embodiments. Thus, any advantages, benefits, or solutions described herein should not be thought of as being critical, required, or essential to all embodiments. Although specific terms are employed herein, they are used in a generic and descriptive sense only and not for purposes of limitation.

That which is claimed:
1. A system comprising:
  a rotational tool comprising:
    an output spindle configured to be operably coupled to a fastener to rotate the fastener;
    a tool torque sensor configured to measure a tool torque on the output spindle to generate a tool torque measurement indicating a torque applied to the output spindle, the tool torque measurement being based on a torque calibration factor stored in a memory of the rotational tool; and
    a tool communications interface configured to transmit and receive wireless communications;
  a calibrator comprising:
    a calibrator shaft comprising an input end and an output end, the calibrator shaft configured to be operably coupled to the output spindle of the rotatable tool on the input end and a fastener on the output end;
    a calibrator torque sensor configured to measure a calibrator torque on the calibrator shaft to generate a calibrator torque measurement indicating a torque applied to the calibrator shaft; and
    a calibrator communications interface configured to establish a wireless communication link with the tool communications interface;
  wherein the rotational tool or the calibrator comprises calibration processing circuitry, the calibration processing circuitry being configured to:
    receive the tool torque measurement;
    receive the calibrator torque measurement associated with the tool toque measurement;
    compare the tool torque measurement to the calibrator torque measurement to determine a difference value;
    aggregate the difference value with previously determined difference values to determine an updated torque calibration factor; and
    cause the torque calibration factor to be automatically replaced with the updated torque calibration factor in the memory of the rotational tool.

2. The system of claim 1, wherein the rotational tool comprises the calibration processing circuitry;
  wherein the calibrator communications interface is configured to transmit the calibrator torque measurement to the tool communications interface to be received by the calibration processing circuitry.

3. The system of claim 1, wherein the calibrator comprises the calibration processing circuitry;
  wherein the tool communications interface is configured to transmit the tool torque measurement to the calibrator communications interface to be received by the calibration processing circuitry;
  wherein the calibration processing circuitry configured to cause the torque calibration factor to be automatically replaced with the updated torque calibration factor includes being configured to transmit the updated torque calibration factor to the tool communications interface to replace the torque calibration factor in the memory of the rotational tool.

4. The system of claim 1, wherein the calibration processing circuitry is configured to communicate, in response to causing the torque calibration factor to be automatically replaced, to a remote tool controller that the rotational tool has been calibrated.

5. The system of claim 1, wherein the calibration processing circuitry configured to aggregate the difference value with previously determined difference values includes being configured to calculate an average difference value based on the difference value and the previously determined difference values;

wherein the average difference value is the updated torque calibration factor.

6. The system of claim 1, wherein the rotational tool is portable and battery powered and the calibrator is portable and battery powered.

7. The system of claim 1, wherein the rotational tool further comprises a user interface and wherein the user interface is configured to receive a user input to place the rotational tool in a calibration mode;
    wherein in response to entering the calibration mode, the rotational tool is configured to, via the tool communications interface, wirelessly pair with the calibrator communications interface to establish the communications link.

8. An apparatus comprising:
    a communications interface configured to establish a wireless communications link between a rotational tool and a calibrator to communicate one of a tool torque measurement or a calibrator torque measurement via the communications link; and
    calibration processing circuitry configured to:
        receive the tool torque measurement measured by a tool torque sensor of the rotational tool;
        receive the calibrator torque measurement associated with the tool toque measurement, the calibrator torque measurement being measured by a calibrator torque sensor of the calibrator;
        compare the tool torque measurement to the calibrator torque measurement to determine a difference value;
        aggregate the difference value with previously determined difference values to determine an updated torque calibration factor; and
        cause a torque calibration factor associated with a torque sensor of the rotational tool to be automatically replaced with the updated torque calibration factor in the memory of the rotational tool.

9. The apparatus of claim 8 further comprising the rotational tool, the rotational tool comprising:
    an output spindle configured to be operably coupled to a fastener to rotate the fastener;
    a tool torque sensor configured to measure a tool torque on the output spindle and generate the tool torque measurement indicating a torque applied to the output spindle, the tool torque measurement being based on the torque calibration factor stored in the memory of the rotational tool; and
    wherein the calibrator torque measurement is received by the communications interface of the apparatus via the communications link from the calibrator.

10. The apparatus of claim 9, wherein the rotational tool further comprises a user interface and wherein the user interface is configured to receive a user input to place the rotational tool in a calibration mode;
    wherein in response to entering the calibration mode, the rotational tool is configured to, via the communications interface, wirelessly pair with the calibrator to establish the communications link.

11. The apparatus of claim 8 further comprising the calibrator, the calibrator comprising:
    a calibrator shaft comprising an input end and an output end, the calibrator shaft configured to be operably coupled to an output spindle of the rotatable tool on the input end and a fastener on the output end; and
    a calibrator torque sensor configured to measure a calibrator torque on the calibrator shaft and generate the calibrator torque measurement indicating a torque applied to the calibrator shaft;
    wherein the tool torque measurement is received by the communications interface of the apparatus via the communications link from the rotational tool;
    wherein the calibration processing circuitry configured to cause the torque calibration factor to be automatically replaced with the updated torque calibration factor includes being configured to transmit the updated torque calibration factor to the rotational tool via the communications link to replace the torque calibration factor in the memory of the rotational tool.

12. The apparatus of claim 8, wherein the calibration processing circuitry is further configured to communicate, in response to causing the torque calibration factor to be automatically replaced, to a remote tool controller that the rotational tool has been calibrated.

13. The apparatus of claim 8, wherein the calibration processing circuitry configured to aggregate the difference value with previously determined difference values includes being configured to calculate an average difference value based on the difference value and the previously determined difference values;
    wherein the average difference value is the updated torque calibration factor.

14. The apparatus of claim 8, wherein the apparatus is portable and battery powered.

15. A method comprising:
    receiving a tool torque measurement measured by a tool torque sensor of a rotational tool;
    receiving, via wireless communications, a calibrator torque measurement associated with the tool toque measurement, the calibrator torque measurement being measured by a calibrator torque sensor of a calibrator;
    comparing the tool torque measurement to the calibrator torque measurement to determine a difference value;
    aggregating the difference value with previously determined difference values to determine an updated torque calibration factor; and
    causing a torque calibration factor associated with a torque sensor of the rotational tool to be automatically replaced with the updated torque calibration factor in the memory of the rotational tool.

16. The method of claim 15 further comprising measuring, by the tool torque sensor, a tool torque on an output spindle of a rotational tool to generate the tool torque measurement indicating a torque applied to the output spindle, the tool torque measurement being based on the torque calibration factor stored in the memory of the rotational tool.

17. The method of claim 16 further comprising:
    receiving a user input via a user interface of the rotational tool to place the rotational tool in a calibration mode; and
    in response to entering the calibration mode, wirelessly pairing the rotational tool to the calibrator to establish the communications link.

18. The method of claim 15 further comprising:
    receiving the tool torque measurement via a wireless communications link from the rotational tool; and
    measuring, by the calibrator torque sensor, a calibrator torque on a calibrator shaft of the calibrator to generate the calibrator torque measurement indicating a torque applied to the calibrator shaft, the calibrator shaft being operably coupled to an output spindle of the rotational tool and a fastener;
    wherein causing the torque calibration factor to be automatically replaced with the updated torque calibration factor comprises transmitting the updated torque calibration factor to the rotational tool via the communications link to replace the torque calibration factor in the memory of the rotational tool.

19. The method of claim 15, wherein aggregating the difference value with previously determined difference values comprises calculating an average difference value based on the difference value and the previously determined difference values;

wherein the average difference value is the updated torque calibration factor.

20. The method of claim 15, wherein receiving the tool torque measurement includes receiving the tool torque measurement at a remote tool controller;

wherein receiving the calibrator torque measurement includes receiving the calibrator torque measurement as the remote tool controller.

* * * * *